UNITED STATES PATENT OFFICE.

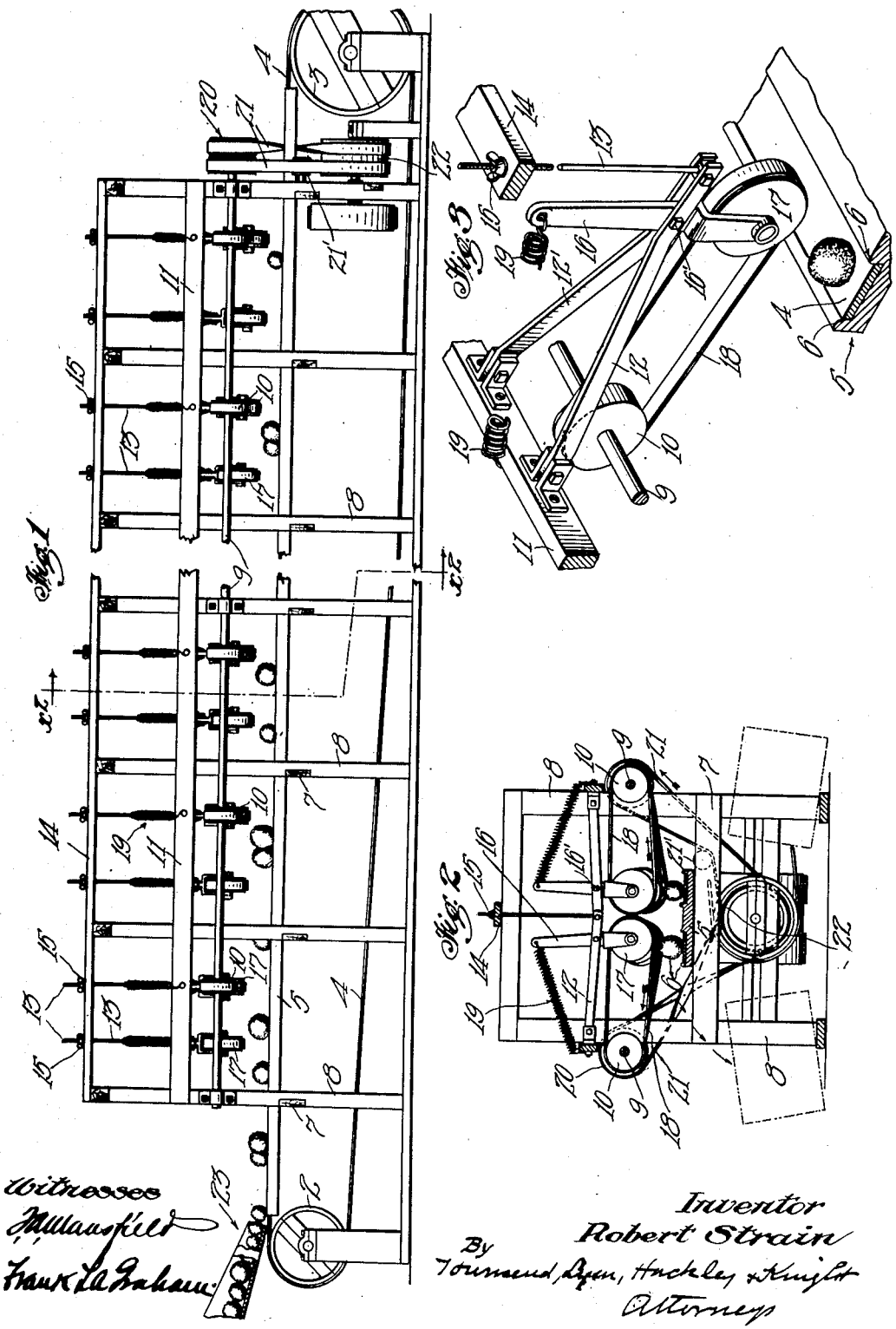

ROBERT STRAIN, OF EL MODENA, CALIFORNIA, ASSIGNOR TO FRED STEBLER AND AUSTIN A. GAMBLE, OF RIVERSIDE, CALIFORNIA.

FRUIT GRADING OR ASSORTING MACHINE.

No. 888,408.      Specification of Letters Patent.      Patented May 19, 1908.

Application filed November 15, 1905. Serial No. 287,494.

*To all whom it may concern:*

Be it known that I, ROBERT STRAIN, a citizen of the United States, residing at El Modena, Orange county, California, have invented certain new and useful Improvements in Fruit Grading or Assorting Machines, of which the following is a specification.

This invention relates to improvements in machines for assorting or grading oranges or other fruits according to their sizes, that separating the fruit into lots, all fruit in each lot being substantially the same dimensions or size.

The object of the invention is to provide an extremely simple and cheap apparatus or machine which shall be positive and efficient in operation, in which all liability to bruise the fruit will be avoided, and in which any desired number of sizes or grades can be secured, the apparatus being preferably so constructed that each grade or size may be individually adjusted.

To these ends my invention consists in a machine having a fruit runway comprising a suitably supported horizontally traveling carrier belt and a series of cross-belts arranged above the horizontal or carrier belt, and adapted to push the fruit laterally off from the carrier belt and into suitable receiving bins or receptacles, the runway formed between this carrier belt and the cross belts being graduated by the adjustment of the cross belts vertically and with respect to the surface of the carrier belt, the distances these cross belts are mounted above the carrier belt determining the sizes of the fruit which will be operated upon by the respective cross belts.

The invention will be more readily understood by reference to the accompanying drawings, forming a part of this specification, and in which:

Figure 1 is a side elevation of a machine embodying my invention. Fig. 2 is a transverse section on the line $x^2$—$x^2$ of Fig. 1. Fig. 3 is a detail perspective view, showing a fragment of the carrier belt and illustrating the manner of mounting the cross belts.

In the drawings I have illustrated a double or two-sided grader or assorter, and it is obvious that the machine may be built as a double or single machine.

In the drawings, 2, 3 represent pulleys, about which the carrier belt 4 operates.

5 represents a grooved bed for the belt 4, the drawing showing two grooves for a double or two-sided machine. Preferably the bed is grooved deep enough to provide beads 6 at each side of the carrier belt. The bed 5 is suitably supported on cross bars 7 in turn supported on uprights or standards 8.

9 represents a shaft suitably supported on the standards 8 and running longitudinally of the machine above the bed 5. At suitable intervals this shaft 9 is provided with pulleys 10. A bar 11 is mounted on the standards 8 and extends longitudinally of the machine. Upon this bar are mounted a series of pivoted arms 12, 12' preferably in pairs, which extend inward from the bar 11 and over the belt 4. The inner ends of each pair of these arms 12, 12' are supported on an adjusting rod 13 which passes through a longitudinal bar 14 mounted on the top of the standards 8. Adjusting screws 15 are provided for holding the rods 13 in the desired position, the ends of the rod 13 being threaded for this purpose. The inner ends of each pair of arms 12, 12' are suitably spaced apart so that a lever-arm 16 may be pivoted therebetween, as by a bolt 16'. The lower end of the lever-arm 16 are forked to receive the pulleys 17. About respective pulleys 10, 17 travel the cross belts 18. Preferably the upper end of the arms 16 are connected by springs 19 to the frame of the machine, thus automatically keeping the cross-belts taut on the pulleys 10, 17. The shafts 9 are preferably provided at the end of the machine with pulleys 20 belted to a suitable drive pulley mounted on a power shaft. Preferably these shafts 9, when a double or two sided machine is used, are each driven by a single belt 21, one of these belts 21 passing from one pulley 20 under an idler 21 thence down about the drive pulley 22, the other belt 21 being crossed as shown and extending about the pulley 22, but any suitable means may be employed and I do not limit my invention to any particular means for mounting the belt or taking up slack therein. The belt 4 is driven by power applied in a preferred manner preferably to the shaft of the pulley 3. It is thus seen that by adjusting the position of the pulleys 17 with respect to the surface of the belt 4 the distances between such surface and the respective cross belts may be varied as desired.

The machine is preferably provided with a feed trough 23 opening onto the carrier belt 4, two feed troughs being provided with a double machine.

With a machine of this construction, the larger sizes are first separated from the fruit carried along by the carrier 4; then, according to the set of the cross belts the succeeding sizes are rolled or discharged therefrom.

I do not deem the various details of construction important as many modifications may be made therein without departing from the scope of my invention.

I claim:—

1. A grading or assorting machine having a fruit runway comprising a horizontally-traveling carrier and a series of cross belts arranged transversely thereabove at graduated heights, and means for rotating said belts and operating said carrier.

2. A grading or assorting machine having a horizontally-traveling carrier belt, a bed therefor, a series of cross belts arranged along the length of said carrier belt transversely to and at graduated heights thereabove, and means for operating said carrier belt and said cross-belts.

3. A grading or assorting machine having a fruit runway comprising a horizontally-traveling carrier and a series of cross belts arranged transversely thereabove at graduated heights, means for adjusting said cross belts with respect to said traveling carrier, and means for rotating said belts and operating said carrier.

4. In a fruit grading machine, the combination of an endless carrying belt running longitudinally in the machine, a transverse grading belt arranged above the carrying belt, and means to adjust the height of the grading belt above the carrying belt.

5. A fruit sizer having a horizontally moving carrier, separating means arranged thereabove at graduated heights, and a line shaft from which said separating means are driven.

6. The combination with a horizontally moving carrier mounted on pulleys at the end of the machine, of separating means spaced apart along said carrier at graduated heights thereabove, said separating means rotating transversely of the movement of said carrier and driven from a line shaft at the side of the machine, and means for adjusting the heights of said separating means.

7. The combination, with a horizontally moving carrier mounted on pulleys at the end of the machine, of separating means spaced apart along said carrier at graduated heights thereabove, said separating means mounted in frames vertically adjustable, a line shaft at the side of the machine and means for driving said separating means from said line shaft.

8. The combination, in a fruit sizer, of a horizontally traveling carrier, and separating means spaced apart along said carrier and at graduated heights therefrom, said separating means rotated in a direction transverse to the movement of said carrier to forcibly eject the fruit from said carrier.

9. A fruit sizer having a horizontally moving carrier, separating means arranged thereabove at graduated heights and spaced apart on said carrier, and means for operating said separating means.

In testimony whereof, I have hereunto set my hand at Los Angeles California this 7th day of November 1905.

ROBERT STRAIN.

In presence of—
FREDERICK S. LYON,
VERNA A. TALBERT.